United States Patent [19]
Ingram

[11] Patent Number: 5,451,360
[45] Date of Patent: Sep. 19, 1995

[54] METHOD AND APPARATUS FOR COMPRESSION MOLDING CLOSURE LINERS

[75] Inventor: Keith W. Ingram, Holland, Ohio

[73] Assignee: Owens-Illinois Closure Inc., Toledo, Ohio

[21] Appl. No.: 135,828

[22] Filed: Oct. 14, 1993

[51] Int. Cl.$^6$ ............................................. B29C 43/18
[52] U.S. Cl. .................... 264/268; 264/40.5; 264/297.6; 264/310; 425/127; 425/149; 425/150; 425/348 R; 425/453; 425/457; 425/809
[58] Field of Search ............ 264/267, 268, 297.5, 264/297.6, 319, 320, 310, 297.8, 40.5; 425/127, 809, 411, 412, 418, 149, 150, 348 R, 453, 457

[56] References Cited

U.S. PATENT DOCUMENTS

| | | |
|---|---|---|
| 2,072,536 | 3/1937 | Trickey et al. |
| 2,514,486 | 7/1950 | Green ................................. 425/418 |
| 2,930,081 | 3/1960 | Wilckens et al. |
| 3,547,746 | 12/1970 | Gwinner ........................... 264/268 |
| 3,657,941 | 4/1972 | Engler ............................... 264/310 |
| 3,827,843 | 8/1974 | Blouch |
| 4,274,822 | 6/1981 | Tamai et al. |
| 4,312,824 | 1/1982 | Mori et al. |
| 4,398,875 | 8/1983 | Kawashima et al. .............. 264/268 |
| 4,497,765 | 2/1985 | Wilde et al. |
| 4,690,666 | 9/1987 | Alexander et al. ................ 425/412 |
| 4,776,782 | 10/1988 | Murayama et al. ............... 425/809 |
| 4,828,474 | 5/1989 | Ballantyne ....................... 425/411 |

*Primary Examiner*—Mathieu D. Vargot

[57] ABSTRACT

A method and apparatus for compression molding closure liners wherein a set of tooling including a first assembly and second assembly which are movable toward and away from one another. The first assembly of tooling has a liner forming member and a closure engaging sleeve thereon and the second assembly has a closure supporting pad thereon. A cam is associated with the first assembly of tooling for moving the closure engaging sleeve into engagement with a closure and the liner forming member into position for compression molding a charge of plastic extrudate in the closure when it is supported on the closure supporting pad. A gas cylinder is associated with the closure supporting pad providing a predetermined controlled pressure that determines the compression molding force on the plastic. In a preferred mode, a plurality of sets of tooling are provided in circumferentially spaced relation to one another on a turret.

29 Claims, 9 Drawing Sheets

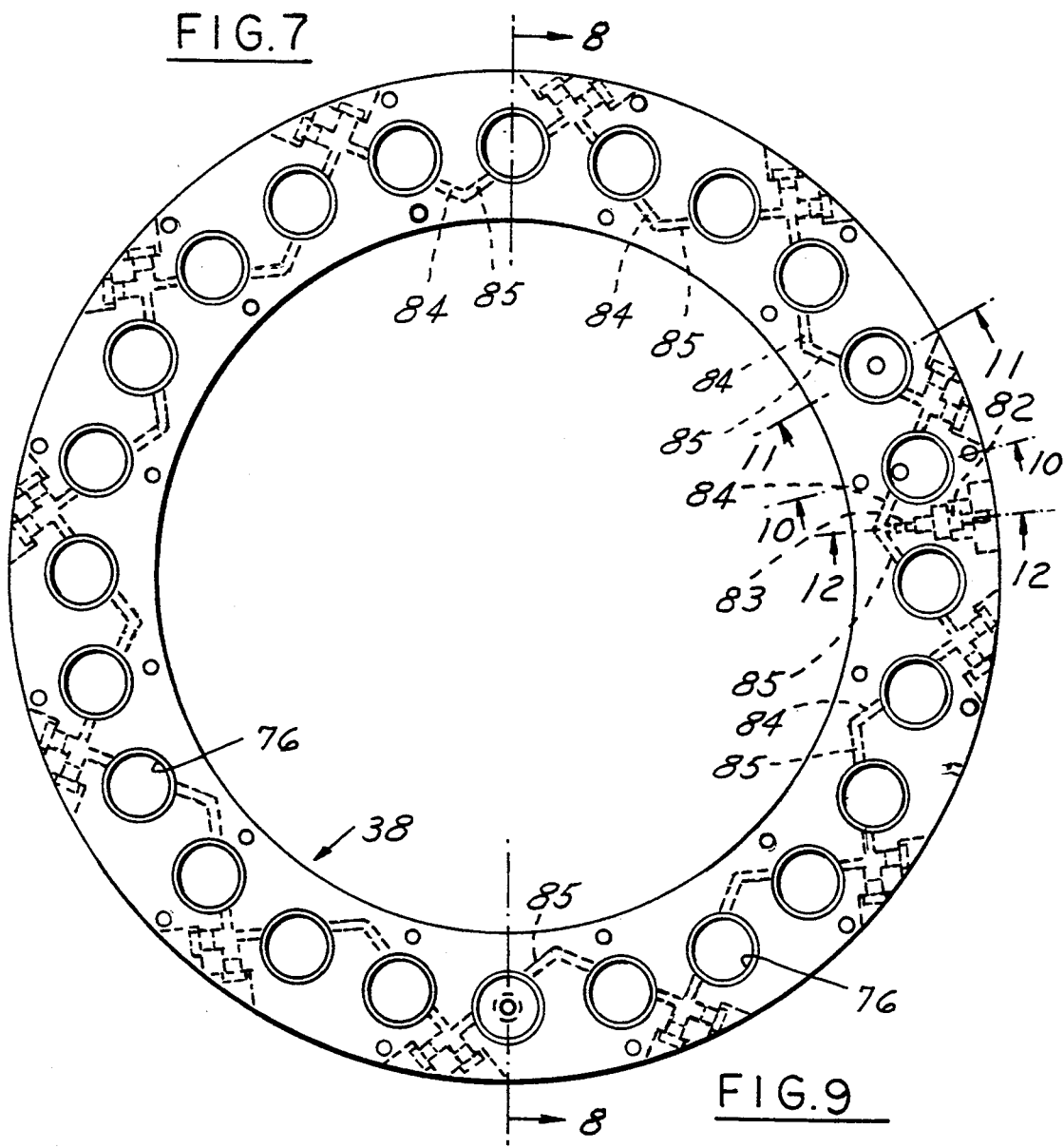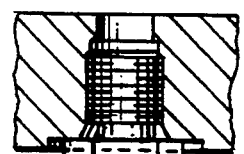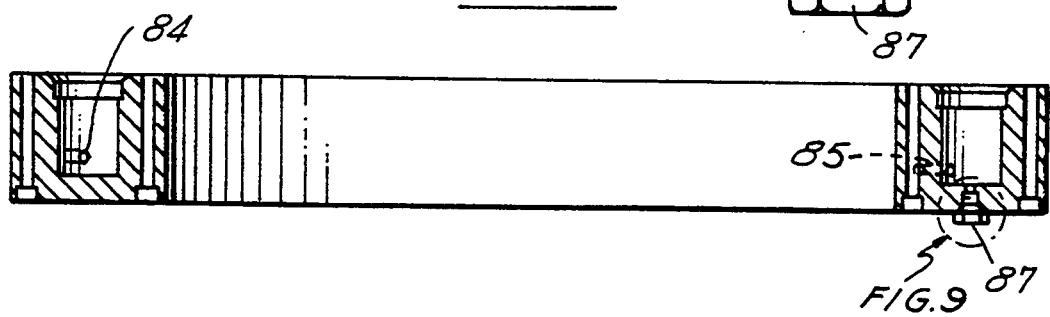

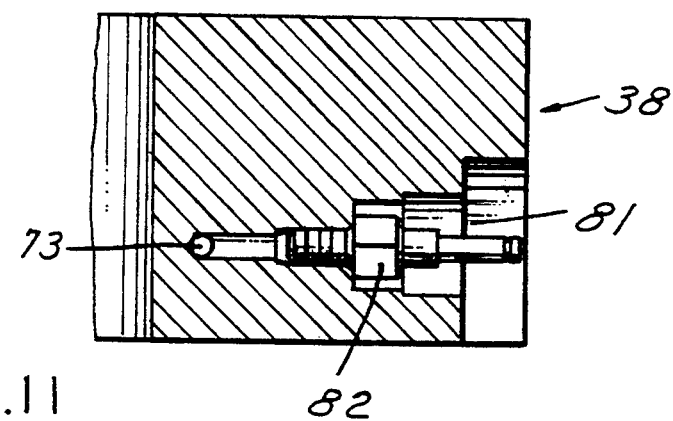
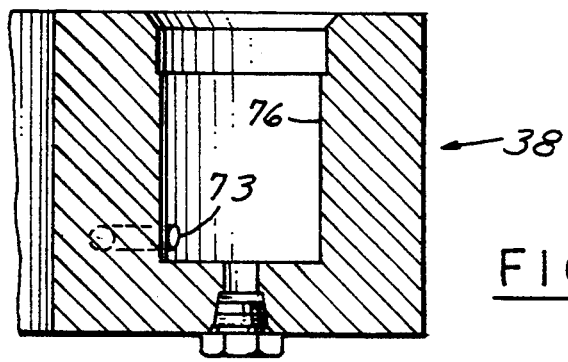
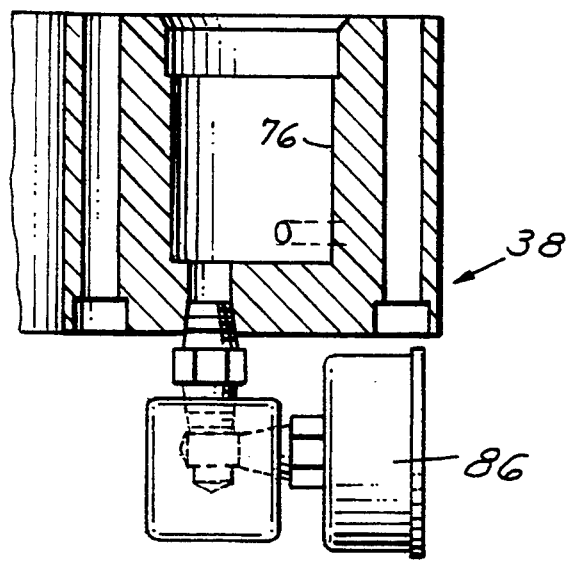

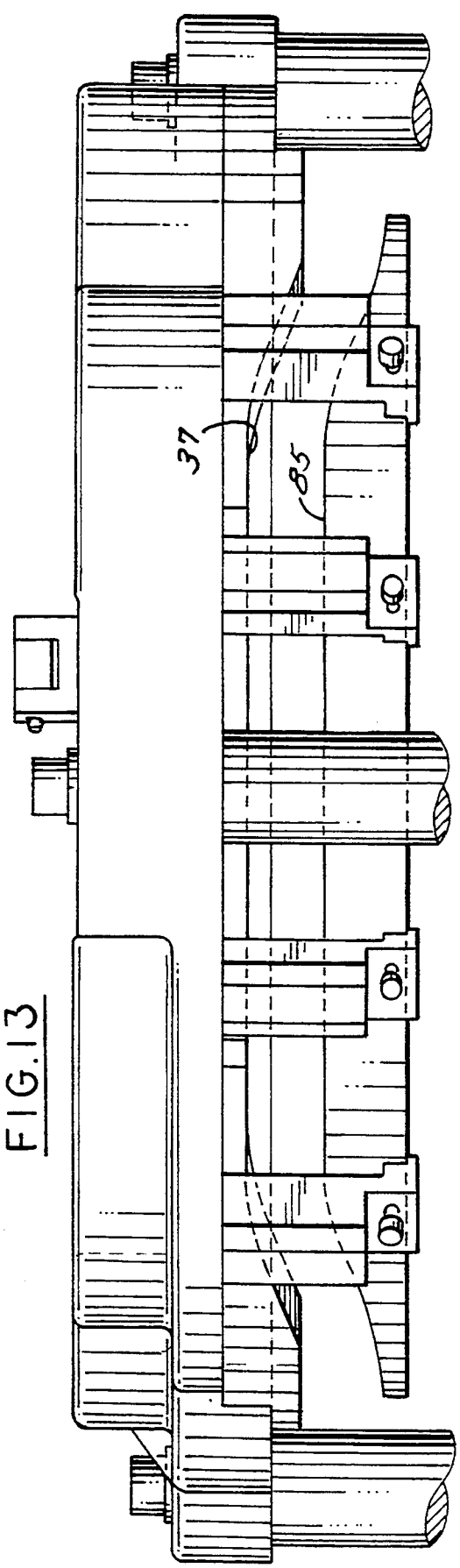
FIG.13
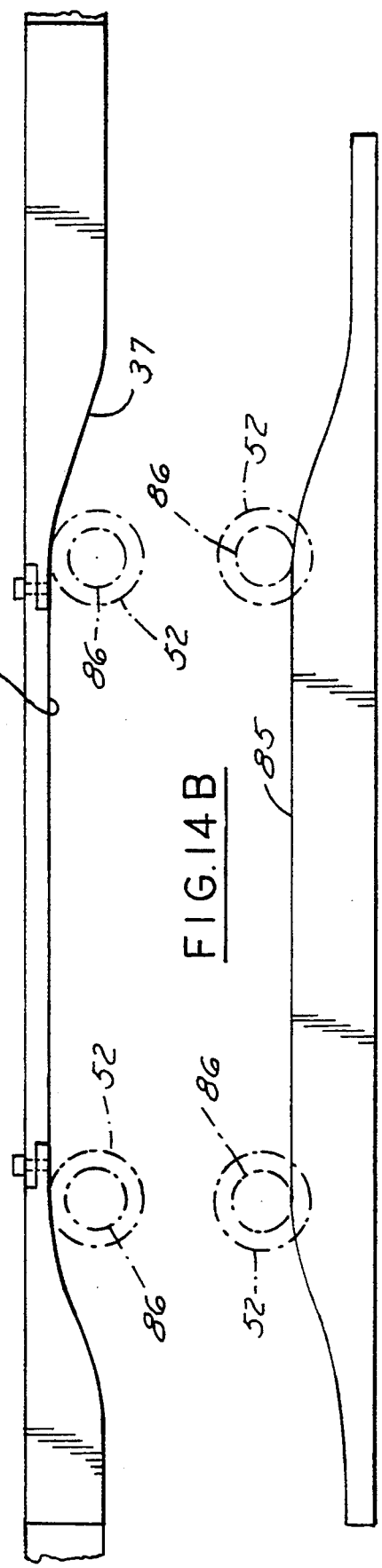
FIG.14A
FIG.14B

METHOD AND APPARATUS FOR COMPRESSION MOLDING CLOSURE LINERS

This invention relates to compression molding of liners in closures.

BACKGROUND AND SUMMARY OF THE INVENTION

In forming liners in closures, it has been common to compression mold the liner. Typical patents showing such a method and apparatus are U.S. Pat. Nos. 2,072,536, 2,930,081, 3,827,843, 4,274,822, 4,312,824 and 4,497,765.

One of the problems in compression molding of liners is that of controlling the molding force when molding liners directly into a closure such that sufficient molding force is used to fill the required seal volume and not produce shorts and, at the same time, to limit this same force to avoid flashing of the liner. This force should be consistent and equal on each of all toolings to avoid process variability. The use of compression springs to control this force would not be consistent from tool to tool due to the variability of the rating of the springs and due to the inevitable fatigue that would be induced after substantial length of running. Further, means to readily adjust the molding force of all toolings with one adjustment of system pressure is desirable.

Among the objectives of the present invention are to provide a method and apparatus for compression molding liners in plastic closures wherein the molding pressure on the charge that is being shaped to define the liner is accurately controlled; wherein when an array of tooling is provided, each set of tooling functions independently of the other; wherein the forming pressure can be readily changed; and wherein the tooling can be readily assembled and removed.

In accordance with the invention, the method and apparatus for compression molding closure liners includes providing a first assembly and second assembly which are movable toward and away from one another. The first assembly of tooling includes a liner forming member, a closure engaging sleeve thereon, and the second assembly has a closure supporting pad thereon. A cam is associated with the first assembly of tooling for moving the closure engaging sleeve into engagement with a closure and the liner forming member into position for compression molding a charge of plastic extrudate in the closure when it is supported on the closure supporting pad. A gas cylinder is associated with the closure supporting pad containing gas at a predetermined pressure providing a controlled molding pressure on the plastic. In a preferred mode, a plurality of sets of tooling are provided in circumferentially spaced relation to one another. Means are provided for readily changing the pressure.

DESCRIPTION OF THE DRAWINGS

FIG. 7 is a plan view of a nitrogen manifold utilized in the apparatus.

FIG. 8 is a sectional view taken along the line 8—8 in FIG. 7.

FIG. 9 is a sectional view taken along at the circle 9—9 in FIG. 8.

FIG. 10 is a fragmentary sectional view taken along the line 10—10 in FIG. 7.

FIG. 11 is a fragmentary sectional view taken along the line 11—11 in FIG. 7.

FIG. 12 is a fragmentary sectional view taken along the line 12—12 in FIG. 7.

FIG. 13 is a fragmentary side elevational view of cams utilized in the apparatus.

FIG. 14A is a fragmentary view of the upper cam shown in FIG. 13.

FIG. 14B is a view of the lower cam shown in FIG. 13.

DESCRIPTION

Figure 1:
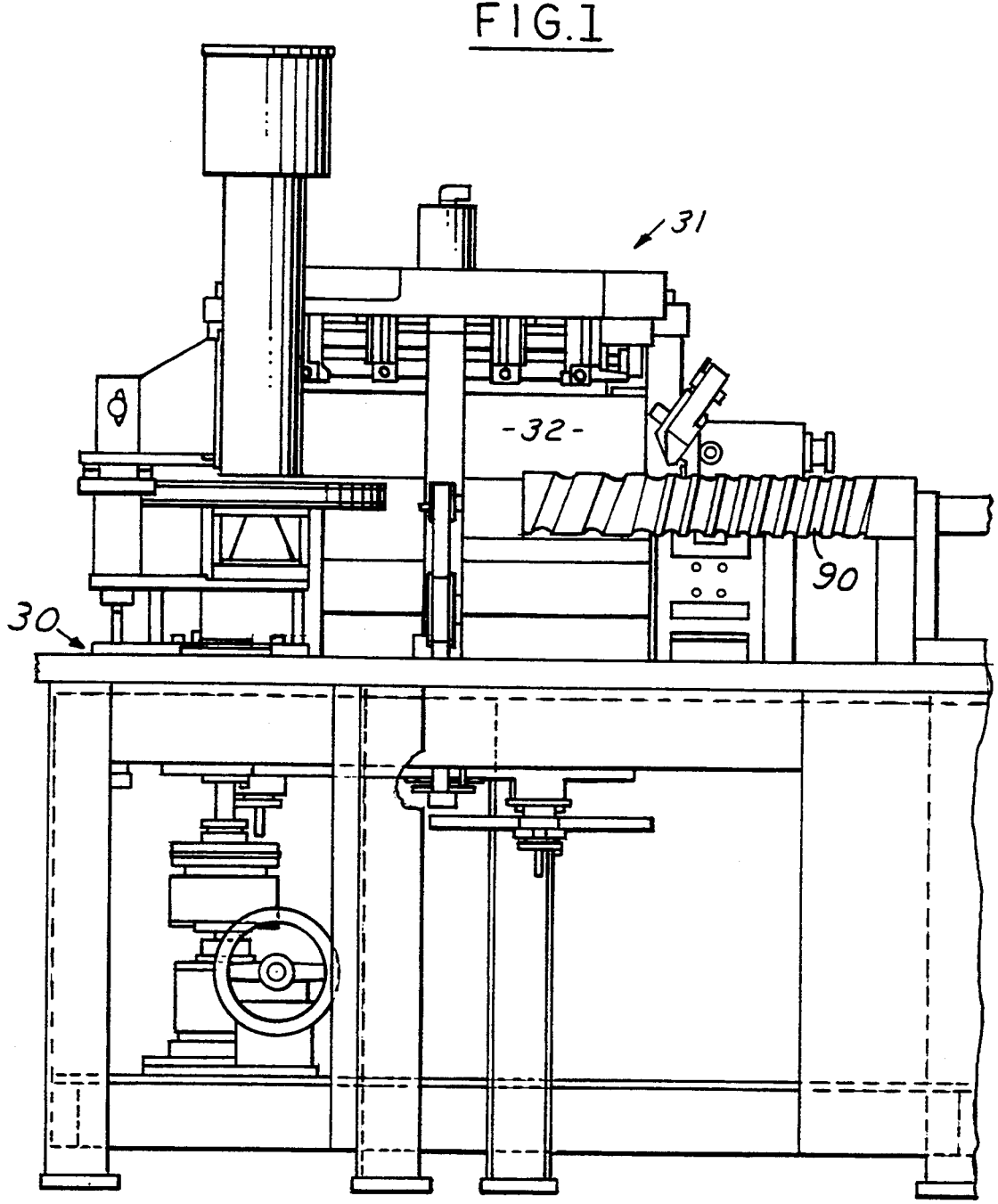
FIG. 1 is a front elevational view of an apparatus embodying the invention.
Figure 2:
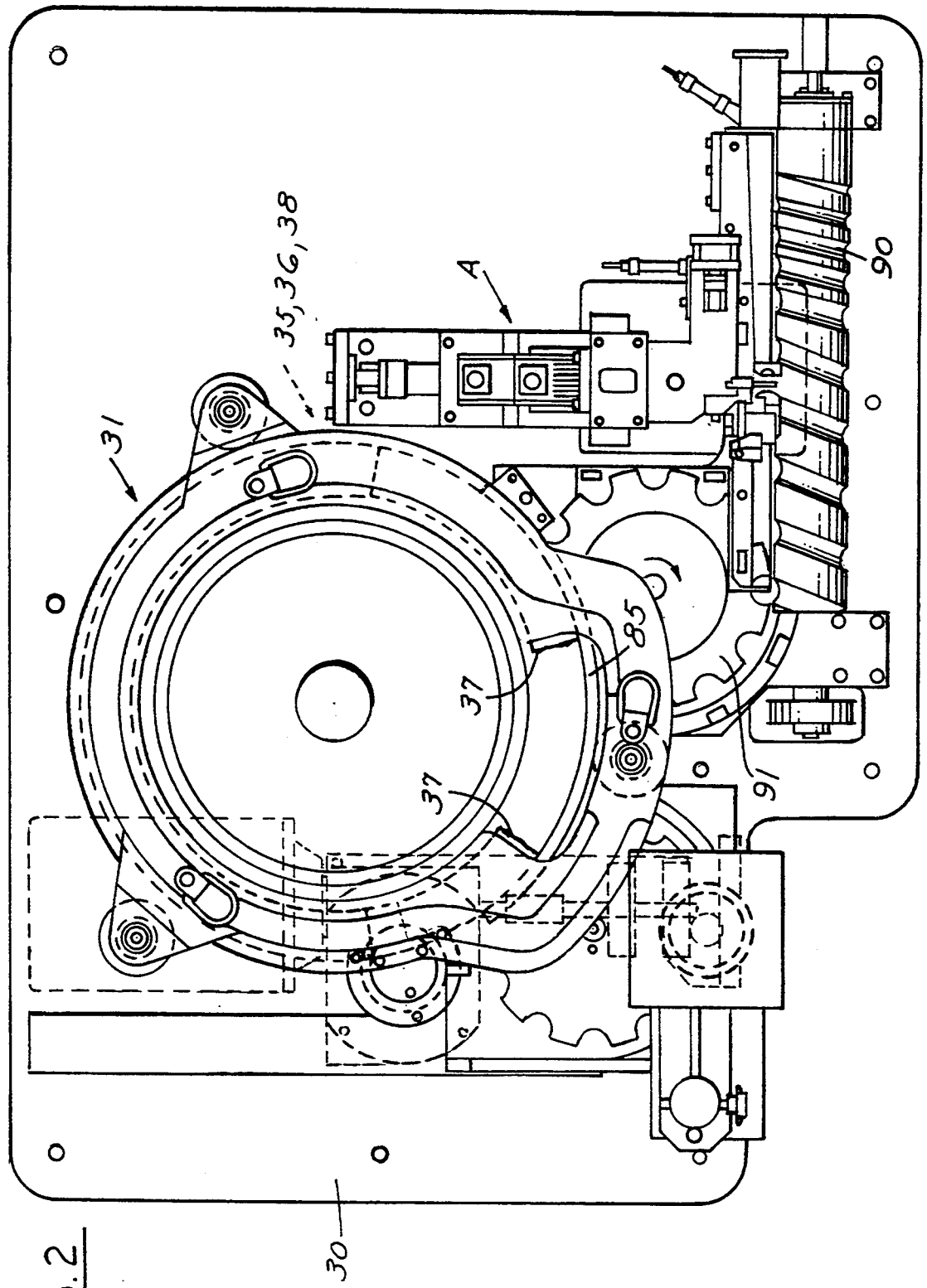
FIG. 2 is a top plan view, parts being broken away.
Figure 3:
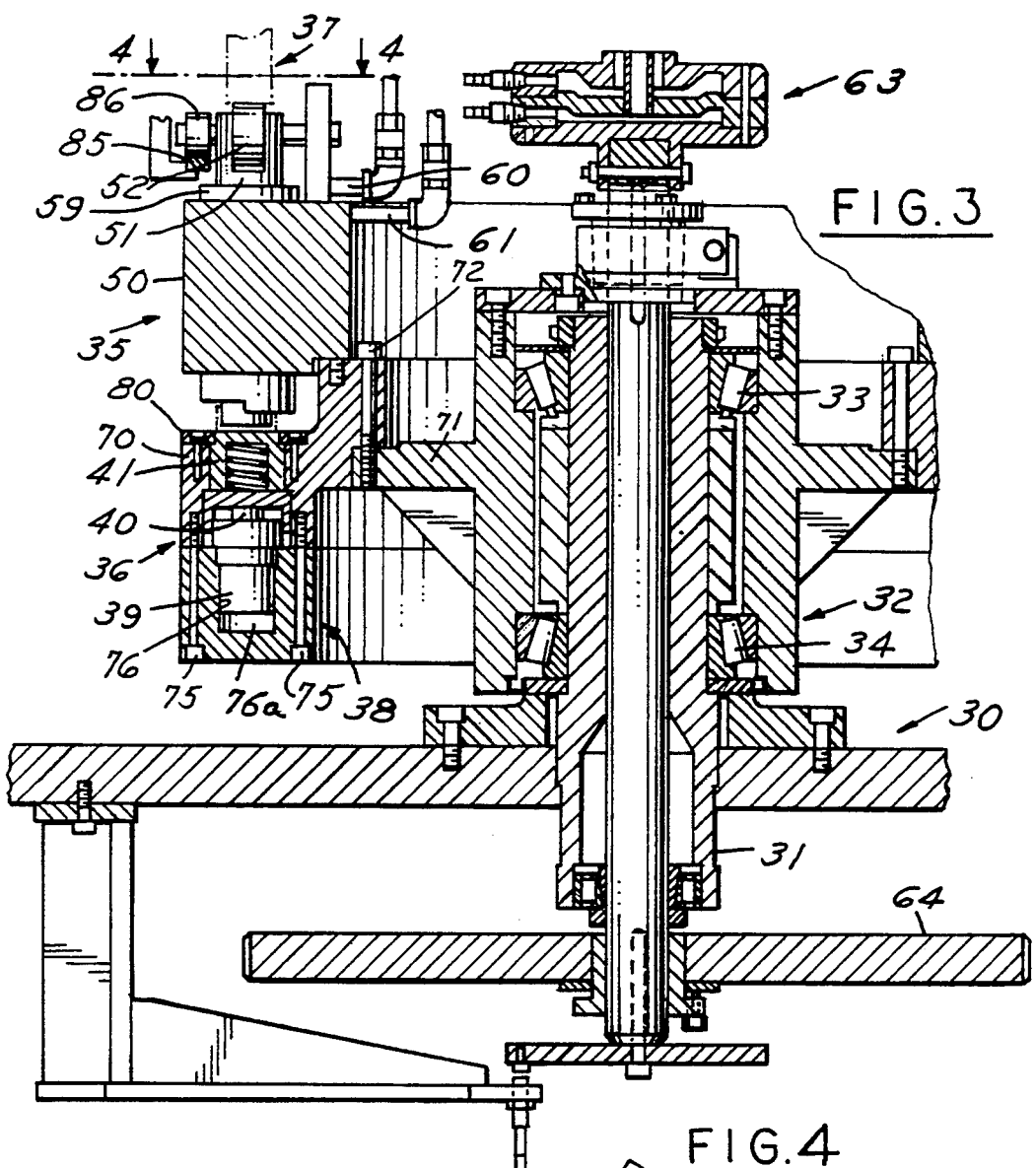
FIG. 3 is a fragmentary vertical sectional view through a portion of the apparatus.
Figure 4:
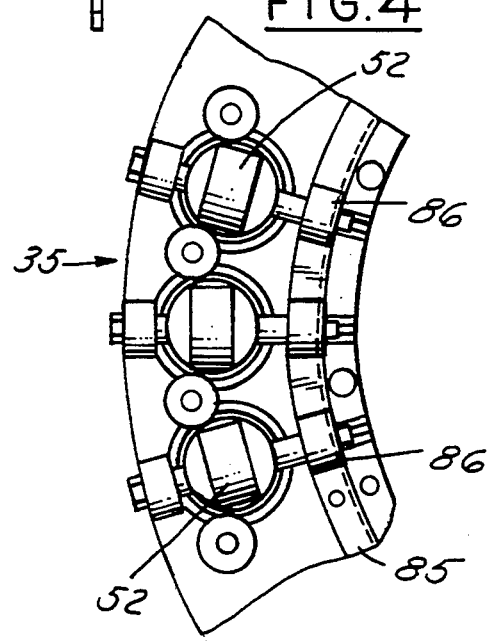
FIG. 4 is a fragmentary plan view taken along the line 4—4 in FIG. 3.

Referring to FIGS. 1–3, the apparatus embodying the invention comprises a base 30 on which a column 31 is fixed. A carousel or turret 32 is rotatably mounted on column 31 by upper and lower bearings 33, 34. The turret 32 supports sets of tooling comprising a first or upper assembly 35 of tooling and a second or lower assembly 36 of tooling circumferentially spaced about the turret 32. An annular fixed cam 37 is provided and is associated with the first assembly 35 of tooling, as presently described. Each second assembly 36 of tooling further includes an annular gas manifold 38 that supports a plurality of circumferentially spaced gas cylinders 39. Piston 40 of gas cylinder 39 acts against a closure supporting pad 41 in the lower or second set of tooling 36 through an intermediate member 42 (FIG. 7). The manifold 38 and gas cylinders 39 are charged with an atmospheric gas, preferably nitrogen, at predetermined pressure.

Figure 5:
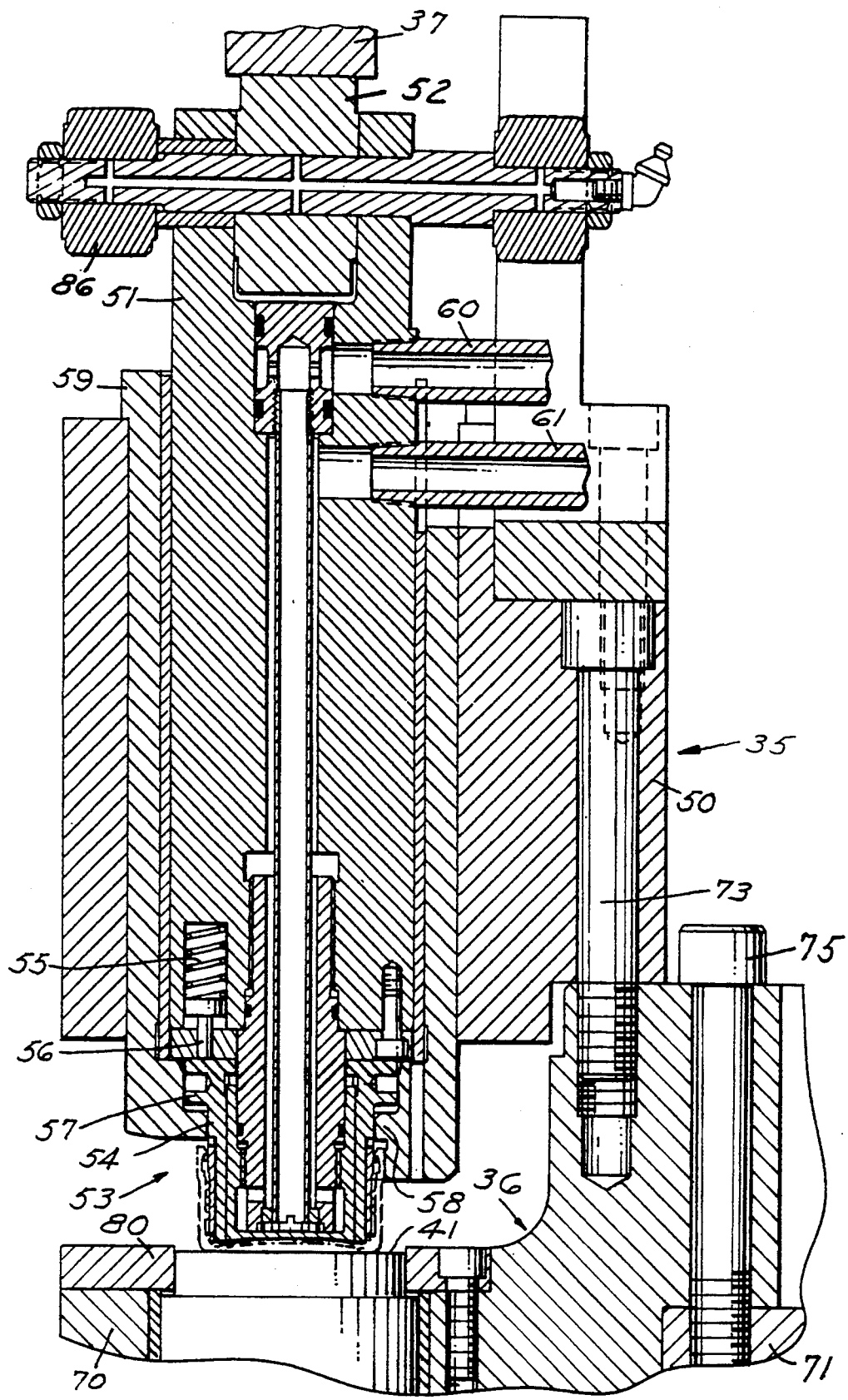
FIG. 5 is a fragmentary sectional view on an enlarged scale of a first or upper assembly of tooling shown in FIG. 3.
Figure 6:
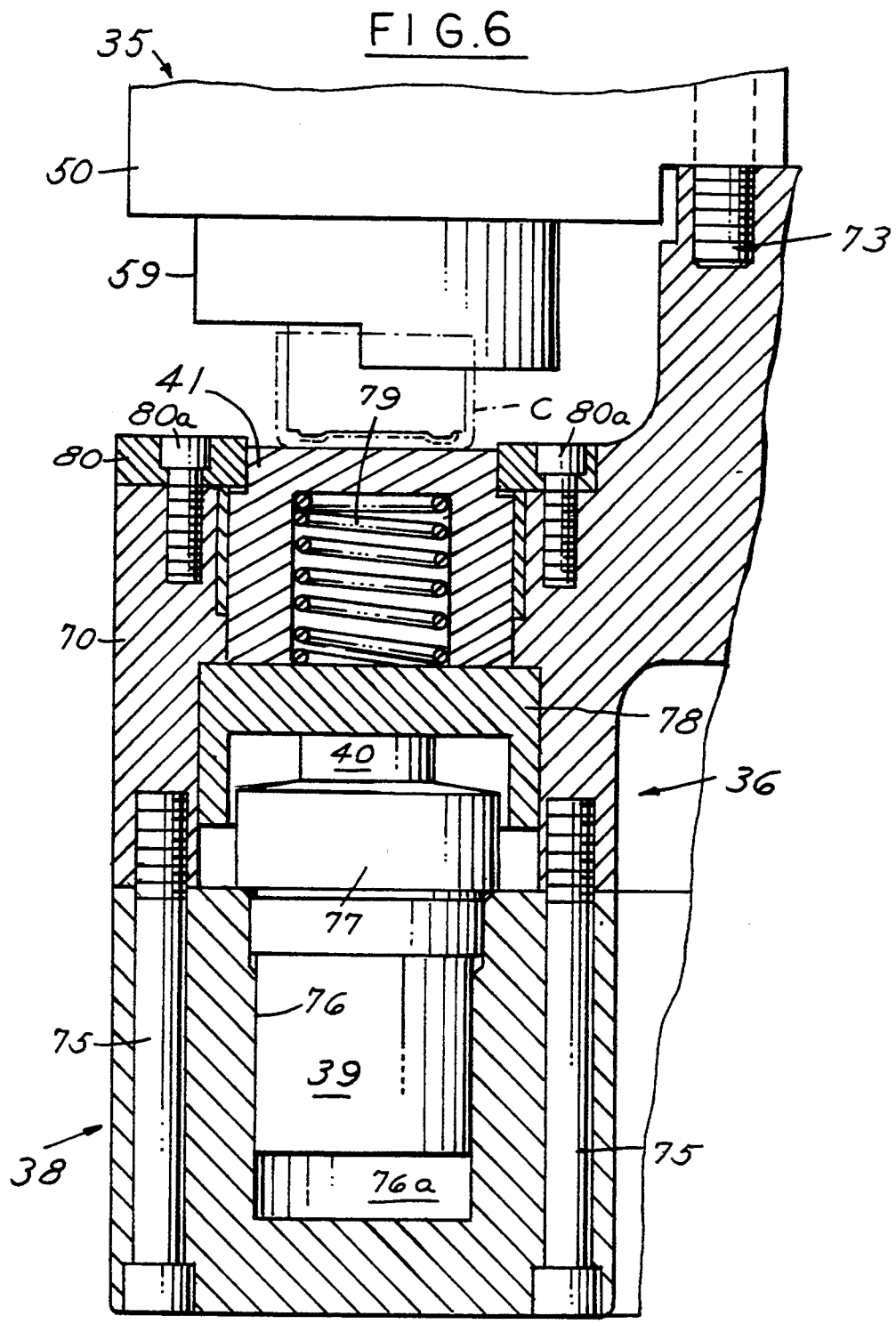
FIG. 6 is a fragmentary vertical sectional view on an enlarged scale of a second or lower assembly of tooling shown in FIG. 3.
Figure 15:
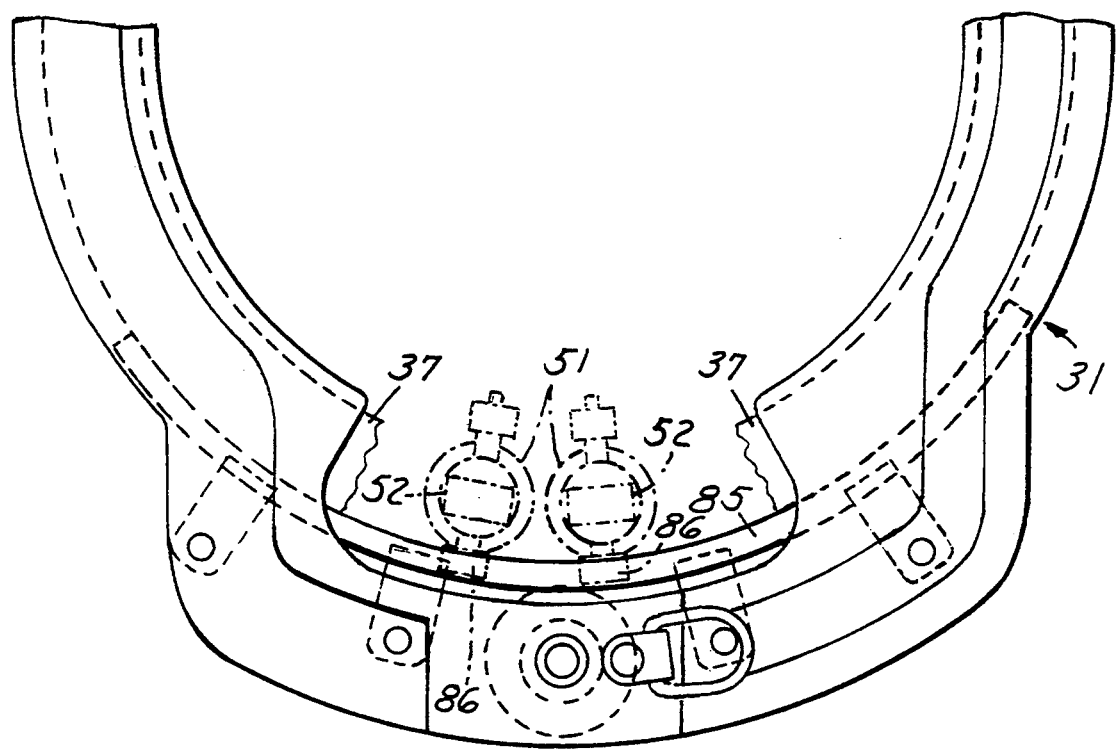
FIG. 15 is a fragmentary plan view of a portion of the apparatus shown in FIG. 1.

Referring to FIGS. 5 and 6, each first assembly 35 of tooling comprises an annular support 50. An actuator 51 is movable vertically in support 50 by engagement with a cam follower roller 52 on the actuator 51 with cam 37 to move a liner forming plunger assembly 53 mounted on the actuator 51 downwardly through a fixed stroke. A closure engaging sleeve 54 is provided about the liner forming tool 53 and is yieldingly urged axially outwardly and downwardly by circumferentially spaced springs 55 engaging pins 56. A flange 57 on the tooling limits the outward movement by engagement with a flange 58 on an outer fixed sleeve 59.

Coolant is provided to the interior of the liner forming plunger 53 and circulated therethrough through inlet 60 and outlet 61 connected, in turn, to a distributor 63 mounted rotatably in the column 31 and rotated by a gear 64 such that the distributor and associated hoses, not shown, move with each set of tooling 35 (FIG. 3).

Referring to FIGS. 3 and 5, the closure supporting pads 41 are mounted in a support ring 70 that, in turn, is mounted on a radial flange 71 on the turret 32. The support ring 70 is secured to flange 71 by bolts 72. The annular support 50 for the first assemblies 35 is supported on the support ring 70 by bolts 73 (FIGS. 5, 7).

Referring to FIGS. 3 and 6, annular gas manifold 38 is mounted on the underside of support ring 70 by bolts 75. The gas cylinders 39 are mounted on the gas manifold 38 and extend into cylindrical openings 76 that extend downwardly. Each gas cylinder 39 has an annular flange 77 that engages the upper surface of gas manifold 38 and cooperates therewith to form a seal. The piston 40 of each cylinder 39 engages an intermediate member 78 which, in turn, engages the closure support pad 41. A light spring 79 urges the pad 41 upwardly to facilitate loading of a closure C in position on the pad 41. A retaining ring 80 held in position by bolts 80a limits the upward movement of the pad 41.

Referring to FIGS. 7–12, gas manifold 38 has an inlet 81 with an associated one-way valve 82 (FIG. 12). The chambers 76a of openings 76 beneath each gas cylinder 38 (FIG. 6) are interconnected by passages 83–85 to provide a manifold chamber in the chambers 76a beneath the cylinders. The manifold chamber is provided with nitrogen at a predetermined high pressure thereby defining a manifold chamber 76a beneath each gas cylinder 39 which is at the predetermined pressure. The passages 84, 85 provide communication to chamber 76a.

One or more of the chambers 76a can be provided with a pressure gauge 86 (FIG. 10) or a rupture disk 87 for pressure relief (FIGS. 8, 9 and 11).

Referring to FIGS. 14A and 14B, cam 37 is positioned to lower the upper tooling 35 into position by engagement of the roller 52 on the upper tooling 35 for compressing the liner. A second cam 85 is provided for engaging a second roller 86 on actuator 51 (FIG. 5) to lift the upper tooling in order to facilitate placement and removal of closures on the closure supporting pads 41.

The closures C are preferably made of plastic such as polypropylene or polyethylene and comprise a base wall and a peripheral skirt. A typical closure is such as shown in U.S. patent application Ser. No. 07/920,931 filed Jul. 28, 1992, now U.S. Pat. No. 5,265,747, incorporated herein by reference.

In operation, charges of molten plastic are fed successively to each closure C positioned in inverted position as it is moved through a worm 90 and starwheel 91. The charge of extrudate of plastic material for forming the liner may be delivered to each closure when the closure is in any position either before it enters the turret 32 or after it has entered the turret 32.

As the closure C is moved by supporting pad 41 between the first or upper assembly 35 of tooling and the lower assembly 36 of tooling which supports the closure and turret 32 is rotated, the cam 37 moves the upper tooling 35 downwardly causing the sleeve 53 to engage the closure C and then move the liner forming plunger 53 downwardly through a fixed stroke to compress the charge of plastic into a liner. After the initial compression of the light spring 79, the control of the forming pressure is through the predetermined pressure on the piston rod 40 of the gas cylinder 39.

Inasmuch as the pressure of the gas cylinder 39 is at a very high pressure, for example, on the order to 850 p.s.i., and the amount of movement is very small on the order of 0.020 in., the volume of glass displaced relative to the total volume of the system is relatively insignificant. The gas volume of the manifold is thereby substantially constant and the force generated by each cylinder is substantially constant. Accordingly, the forming or compression force on the charge of plastic is accurately controlled at a predetermined pressure.

After a predetermined portion of the cycle of application of a very high pressure, the cam 37 has a rise that allows the upper tool forming plunger 53 to retract sufficiently to raise the lower support plate 41 until the support plate 41 contacts the shoulder and the support pad 51 and is supported only by the spring 79. During this stage, the molding force is reduced during the plastic cure.

Furthermore, it is possible to adjust the pressure in the manifold by increasing or decreasing the pressure through the inlet valve 81.

It can thus be seen that in accordance with the invention, the control of mold forces within each set of compression molding tool, is independent of external compensating means.

The turret or carousel is mounted on heavy duty taper roller bearings to adequately withstand the cantilevered loading of the molding force. The gas manifold 38 has cross drillings 83–85 in place to connect all the cylinders 39 to a common chamber and to a common charging port for system pressure setting.

The upper tooling ring 50 is attached to the turret and has bushings to guide each upper tooling assembly 35 in the form of a cartridge and its associated inner tooling components as it is actuated downwardly by the cam roller 52 engaging the upper cam 37 (FIGS. 13, 14A and 14B). The inner tooling components include a spring loaded outer tooling components including a spring loaded outer sleeve and a directly actuated inner tooling. The upper tooling cam 37 is continuous, and with no moving sections. As the turret 32 rotates, successive sets of upper tooling are actuated downwardly toward the closure as it rests on the lower tooling plate, and the outer sleeve engages the closure seal ring and begins to compress the springs. The previously introduced extruded pellet in the closure is formed by the advancing inner plunger 53, and each inner tooling continues to advance a common fixed stroke. The advancing inner plunger creates a pressure within the melt, and this in turn results in a force transmitted to the load plate 41, which then compresses the spring until the piston rod is engaged. The gas cylinder 39 resists the force of molding until the preset limiting force is achieved, whereby the cylinder compresses to limit the molding force. The inner plunger continues to complete its fixed stroke, and during this time the mold force remains at its limiting force as preset by the gas pressure.

To offload the tooling forces after molding, the upper cam has a rise, for example, of about 0.040 in., and this allows the upper tool to retract sufficiently to raise the supporting pad 41 and the load plate until the intermediate plate 70 contacts the shoulder in the tooling ring, and the tooling plate is supported only by the spring. Thus during the curing stage, the molding force is reduced. As indicated above, the cantilevered load on the turret is opposed by the tapered roller bearing mount of the turret.

It can thus be seen that there has been provided a method and apparatus for compression molding liners in plastic closures wherein the molding pressure on the charge that is being shaped to define the liner is accurately controlled; wherein when an array of tooling is provided, each set of tooling functions independently of the other; wherein the forming pressure can be readily changed; and wherein the tooling can be readily assembled and removed.

I claim:

1. A method for compression molding liners in closures having a base wall and a peripheral skirt comprising providing a first set of tooling including a first assembly having a liner forming plunger, a first sleeve surrounding the plunger and a closure engaging sleeve surrounding the first sleeve, and a second assembly including a closure supporting pad, providing a cam for moving the liner forming plunger toward the closure supporting pad, providing a gas cylinder having a gas pressure chamber and including a piston operable on with one of said closure supporting pad and said liner forming plunger, positioning a closure on the closure supporting pad, delivering a charge of extrudate of plastic material into the closure, causing the cam to move the closure engaging sleeve into engagement with the closure and the liner forming plunger through a fixed stroke within the closure to compress the charge and form a liner, and controlling the compression molding force by the magnitude of pressure within the gas cylinder.

2. The method set forth in claim 1 wherein the step of providing a gas cylinder comprises positioning the gas cylinder beneath the closure supporting pad.

3. The method set forth in any one of claims 1 or 2 wherein said step of providing a gas cylinder includes providing a predetermined pressure in said gas cylinder.

4. The method set forth in any one of claims 1, 2 or 3 including providing an array of said sets of tooling including first assemblies and second assemblies and including said gas cylinders, moving said sets of tooling successively in an endless path past a station wherein a charge of extrudate is delivered successively to a closure on the supporting pad of each second assembly, and thereafter moving said sets of tooling relatively and successively such that said cam causes a liner to be formed in each closure and the respective gas cylinder controls the compression force.

5. The method set forth in claim 4 including the step of interconnecting the gas chambers of said gas cylinders.

6. The method set forth in claim 5 wherein said step of interconnecting cylinders comprises providing a manifold communicating with said gas chambers.

7. The method set forth in claim 6 including the step of supporting said cylinders in said manifold.

8. The method set forth in claim 7 including the step of supplying gas to said manifold at a predetermined pressure.

9. An apparatus for forming a liner in a closure comprising a set of tooling comprising a first assembly including a liner forming plunger, a first sleeve surrounding the plunger, and a closure engaging sleeve surrounding said first sleeve, a second assembly including a closure supporting pad for supporting a closure in position with respect to the first assembly, a gas cylinder having a gas pressure chamber and a piston operable on one of said closure supporting pad and said liner forming plunger, a cam for moving the first assembly toward the closure supporting pad and the closure engaging sleeve into engagement with a closure on the pad and the liner forming plunger within the closure through a fixed stroke to form a liner, and means for providing gas at a predetermined pressure into the gas chamber of said cylinder such that the compression molding force is established by the pressure of gas within the cylinder.

10. The apparatus set forth in claim 9 wherein said gas cylinder is provided beneath the closure supporting pad.

11. The apparatus set forth in any one of claims 9 or 10 including an array of said sets of tooling including a first assembly, a second assembly and said gas cylinders, means for moving said sets of tooling in an endless path past a station wherein a charge of extrudate can be delivered to a closure on the supporting pad of each second assembly and thereafter for moving each set of tooling to a position said cam for moving said first assemblies to form a liner.

12. The apparatus set forth in claim 9 including means interconnecting said gas chambers of said gas cylinders.

13. The apparatus set forth in claim 12 wherein said means interconnecting said gas cylinders comprises an annular manifold and means supporting each gas cylinder in position such that the gas chamber of each gas cylinder communicates with said manifold.

14. The apparatus set forth in claim 13 wherein said manifold includes a charging valve through which the predetermined gas pressure in said manifold can be provided.

15. The apparatus set forth in claim 14 wherein said manifold comprises a plurality of circumferentially spaced generally cylindrical chambers into which gas cylinders extend and interconnecting passages in said manifold extending between said cylindrical chambers.

16. The apparatus set forth in any one of claims 12–15 wherein said second assemblies comprise a first annular ring, said closure supporting pads being supported on said ring.

17. The apparatus set forth in claim 16 wherein said first assemblies comprise a second annular ring in which said first assemblies are supported.

18. The apparatus set forth in claim 17 wherein said second annular ring is supported on said first annular ring.

19. The apparatus set forth in claim 18 wherein said first annular ring is mounted on a rotatable turret.

20. The apparatus set forth in claim 19 wherein said second ring includes an array of vertical openings in which said first sets of tooling are supported such that they can be inserted and removed by vertical movement downwardly and upwardly relative to the second annular ring.

21. The apparatus set forth in claim 20 including a second cam positioned for engaging the first set of tooling to lift the plunger when each second assembly is adjacent the station for delivery of a charge of extrudate.

22. The method set forth in claim 2 including providing a second cam for moving the liner forming plunger when said second assembly is in position for the step of receiving a charge of extrudate into the closure.

23. The method set forth in claim 4 including providing a second cam for engaging each said liner forming plunger to lift the plunger when each second assembly is in position for receiving a charge of extrudate into the closure.

24. The apparatus set forth in claim 10 including a second cam for moving the liner forming plunger when said second assembly is in position for receiving a charge of extrudate into a closure.

25. The apparatus set forth in claim 21 wherein said first assembly comprises an annular support, an actuator movable vertically in said support by engagement with said first cam, a closure engaging sleeve provided on said actuator about said plunger and a flange on said plunger and an interengaging flange on said closure engaging sleeve limiting axial outward movement of said plunger.

26. The apparatus set forth in claim 21 wherein each said first assembly comprises an annular support, an actuator movable vertically in said support by engagement with said first cam, a closure engaging sleeve provided on said actuator about said plunger and a flange on said plunger and an interengaging flange on said closure engaging sleeve limiting axial outward movement of said plunger.

27. The apparatus set forth in claim 21 including means for providing coolant to the liner forming plunger.

28. The apparatus set forth in claims 10 wherein said closure supporting pad is supported on an intermediate member, said cylinder having an annular flange engaging said support and a piston engaging said intermediate member and a spring interposed between said pad and said intermediate member urging said pad upwardly.

29. The apparatus set forth in claim 11 wherein each said closure supporting pad is supported on an intermediate member, said cylinder having an annular flange engaging said support and a piston engaging said intermediate member and a spring interposed between said pad and said intermediate member urging said pad upwardly.

* * * * *